Nov. 18, 1952 J. F. NELSON 2,618,041
EMBALMER'S HEADREST
Filed April 7, 1950
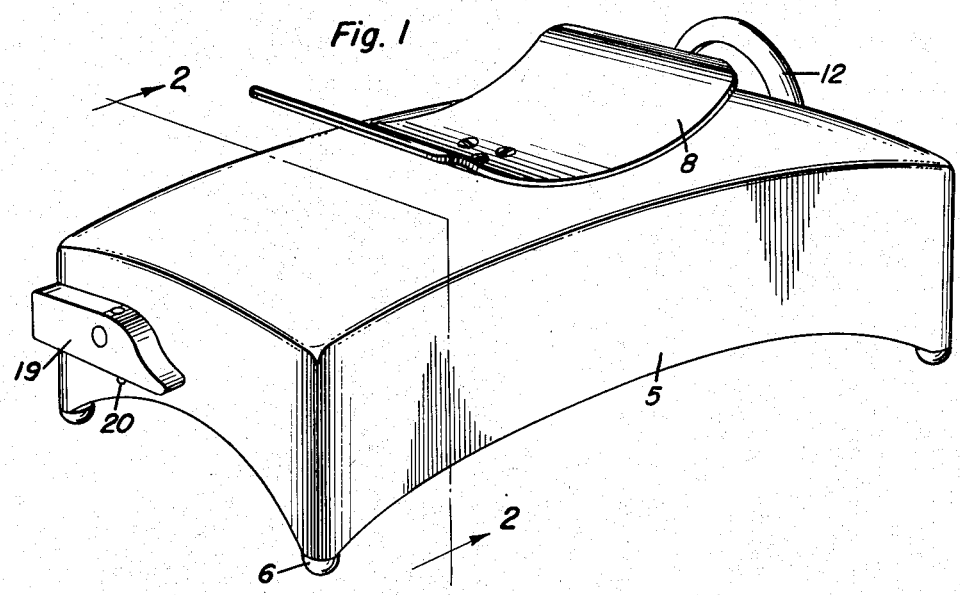
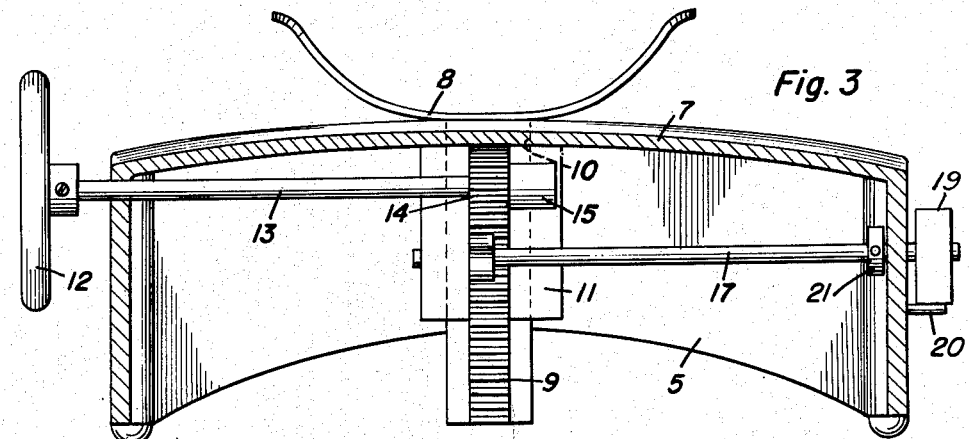
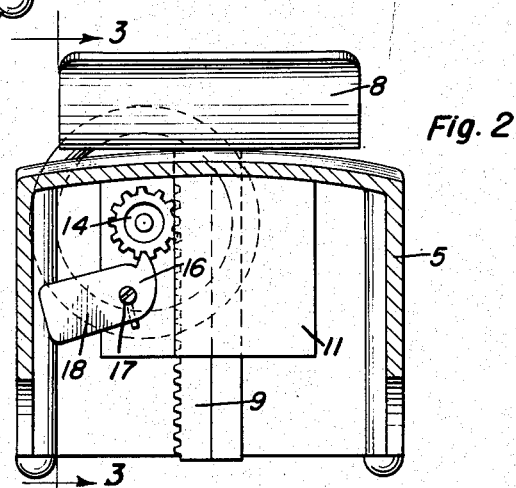
James F. Nelson
INVENTOR.

Patented Nov. 18, 1952

2,618,041

UNITED STATES PATENT OFFICE 2,618,041

EMBALMER'S HEADREST

James F. Nelson, Jacksonville, Fla.

Application April 7, 1950, Serial No. 154,611

2 Claims. (Cl. 27—13)

The present invention relates to new and useful improvements in head rests and more particularly to a head rest designed for use by embalmers for easily and quickly supporting the head in a desired adjusted position.

An important object of the invention is to provide a rack bar and hand operated pinion engaged therewith capable of vertically adjusting the head rest to a substantially fine degree in order to support the head in its most natural position.

A further object of the invention is to provide a locking dog for the pinion with lever or trigger releasing means for the dog when a lowering movement of the head rest is desired.

A still further object is to provide a device of this character of simple and practical construction, which is efficient and reliable in operation, neat and attractive in appearance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view;

Figure 2 is a transverse sectional view taken on a line 2—2 of Figure 1; and

Figure 3 is a longitudinal sectional view taken on a line 3—3 of Figure 2.

Referring now to the drawings in detail, wherein for the purpose of illustration I have disclosed a preferred embodiment of the invention, the numeral 5 designates a substantially rectangular-shaped hollow base which is open at its bottom and provided at its lower corners with rubber buttons or feet 6. The top of the base is preferably rounded as shown at 7.

A substantially crescent-shaped head support 8 is positioned on top of base 5 with a vertical rack bar 9 extending downwardly from the head support through an opening 10 in the top of the base. The rack bar 9 is slidable in a guide 11 suitably secured to the underside of the top of the base.

A hand wheel 12 is secured to the outer end of a shaft 13 which is journaled in one end of the base 5, and to the inner end of the shaft is suitably secured a pinion 14 engaging the teeth of rack bar 9. The inner end of shaft 13 is journaled in a bearing 15 carried by the guide 11.

A locking dog 16 is secured to the inner end of a second shaft 17 which is journaled in an opposite end wall of base 5 and with one end of the dog engaging the pinion 14 and the other end of the dog weighted to hold the dog upwardly in engaged position. A lever or trigger 19 is secured to the outer end of second shaft 17 to rock dog 16 to release the same from pinion 14. One end of lever or trigger 19 engages a stop pin 20 projecting outwardly from the adjacent end of the base to limit releasing movement of the dog to prevent complete rotation or turning over of the dog into an inoperative position.

The inner end of second shaft 17 is also journaled in the guide 11 and a stop collar 21 is secured to shaft 17 at the inside of the base to hold the shaft 17 from endwise movement.

In the operation of the device, the wheel 12 is turned in a direction to rotate pinion 14 for raising rack bar 9 whereby to vertically adjust the head support 8. When it is desired to lower the head support 8, lever or trigger 19 is turned in a direction to release dog 16 from pinion 14 and the head rest 8 may be either quickly lowered or gradually lowered under control of wheel 12.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A head rest comprising a hollow base, a vertically slidable rack bar in the top of the base having a crescent-shaped head support at its upper end, a pair of horizontal shafts journaled in the base with one end of each shaft projecting outwardly of the base, a hand wheel on the outer end of one shaft, a pinion on the inner end of said one shaft engaging the rack bar, a ratcheting locking dog on the inner end of the second shaft engaging the pinion, a dog releasing lever on the outer end of the second shaft swingable to operate the shaft to disengage the dog, and a stop on said base for limiting swinging of the lever to prevent overthrow disengaging movement of said dog.

2. The combination of claim 1, wherein said locking dog is counterbalanced and upwardly swingable to engage the pinion.

JAMES F. NELSON.

REFERENCES CITED

The following references are of record in the file of this patent:

UNITED STATES PATENTS

| Number | Name | Date |
|---|---|---|
| 121,921 | Winn | Dec. 12, 1871 |
| 284,294 | Graves | Sept. 4, 1883 |
| 290,682 | Hedges | Dec. 25, 1883 |
| 303,171 | Long | Aug. 5, 1884 |
| 1,625,267 | Masters et al. | Apr. 19, 1927 |

FOREIGN PATENTS

| Number | Country | Date |
|---|---|---|
| 10,530 | Great Britain | 1885 |